UNITED STATES PATENT OFFICE.

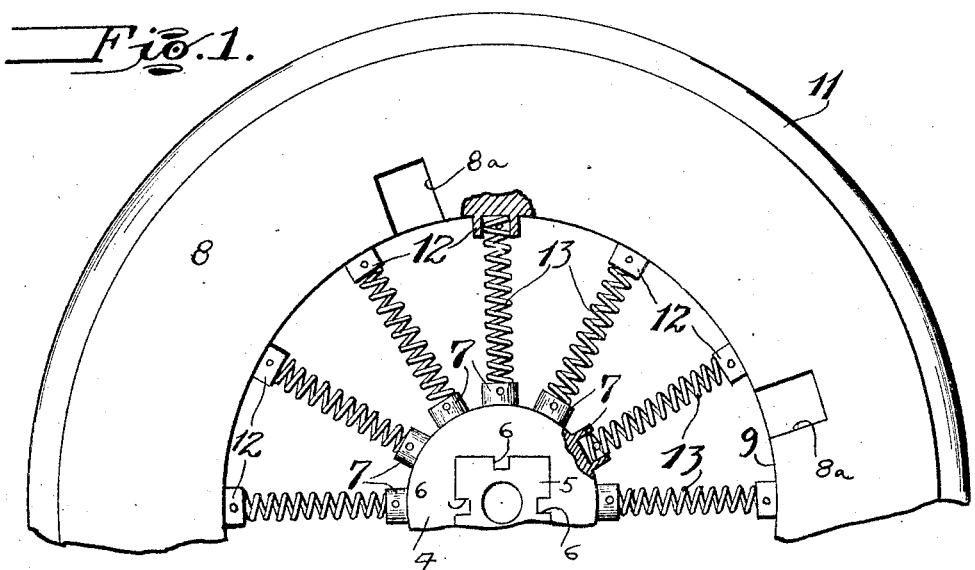
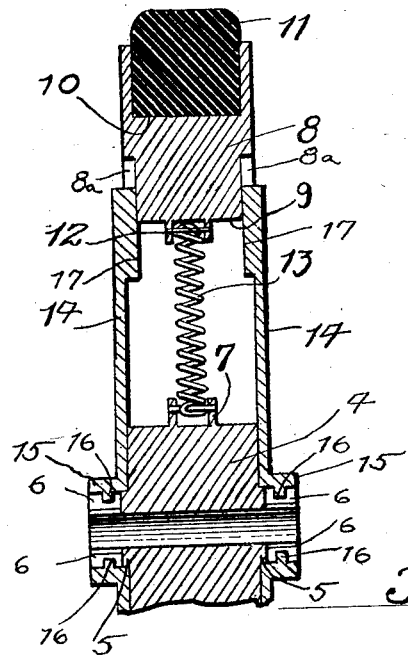
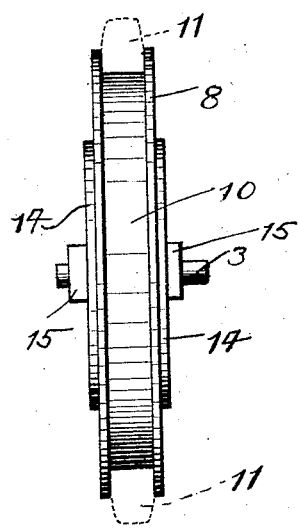

JULIAN D. TERRELL, OF CHARLESTON, WEST VIRGINIA.

RESILIENT VEHICLE WHEEL.

1,411,761.　　　　　Specification of Letters Patent.　　Patented Apr. 4, 1922.

Application filed March 7, 1921. Serial No. 450,159.

*To all whom it may concern:*

Be it known that I, JULIAN D. TERRELL, a citizen of the United States, residing at Charleston, in the county of Kanawha and State of West Virginia, have invented certain new and useful Improvements in Resilient Vehicle Wheels, of which the following is a specification, reference being had to the accompanying drawings.

This invention relates to vehicle wheels and particularly to a wheel capable of being applied to a vehicle so that shocks and jars received by the tread portion of the wheel are not transmitted to the hub of the wheel.

A further object is to provide a device of this character including a hub member which is rotatably mounted on the axle of the vehicle and is operatively connected by resilient means to the tread or ground engaging portion of the wheel.

A still further object of the invention is to provide a device of this character including novel means for protecting the resilient means of the wheel without interfering with the operation of the same.

With these and other objects in view the invention consists in the improved construction and arrangement of parts to be hereinafter more particularly described, fully claimed and illustrated in the accompanying drawings, in which:

Figure 1 is a fragmentary side elevation of a resilient vehicle wheel constructed in accordance with the embodiment of the invention.

Figure 2 is a transverse sectional view, and

Figure 3 is a vertical elevation.

Referring to the drawings, 3 designates the axle of a vehicle on which the hub member 4 is mounted in the well known manner. Each end of the hub member includes an extension or collar 5 substantially rectangular, each face of said collar having a groove 6 which extends laterally of said face. The periphery of the hub member is provided with a plurality of spaced sockets 7 which project from the periphery of said member, the purpose of which will be hereinafter described.

A tread member 8 is provided, said tread member having a relatively large central opening 9 greater in diameter than the diameter of the hub member 4. The tread member 8 has a channel 10 formed in its periphery for the reception of a solid rubber tread 11. It will be noted that the tread member 8 is solid from its outer edge to the inner edge of the opening 9 so as to resist wind pressure and at the same time render the wheel substantial. The side faces of the tread member are provided with a plurality of grooves 8$^a$, said grooves extending through the inner wall of the tread member.

The tread member 8 is adapted to suround the hub member 4 so that the periphery of the hub member is disposed in annular spaced relation to the edge of the opening 9. The inner edge formed by the opening 9 of the tread member 8 is provided with a plurality of spaced socket members 12. These socket members are adapted to receive one end of a coil spring 13. The springs extend between the tread member and the hub, the inner ends of said springs being disposed within the sockets 7 of the hub member. By this means the tread member is operatively connected to the hub member and so arranged that when the springs disposed at the lowest point of the wheel are compressed, the upper springs will be expanded and the remaining springs adjusted accordingly so that the vehicle will be properly cushioned at all times.

Guard plates 14 are adapted to be disposed on each side of the wheel, each plate having a collar 15 adapted to engage the faces of the collars 5, so as to cause rotation of the plate. Projecting inwardly of each of the collars 15 is a plurality of lugs 16 adapted to be disposed in the grooves 6 of the collar 5. By this means, each plate rotates with the hub member 4, and at the same time protects the springs 13. Projecting from the inner face of each of the plates 14 and adjacent the periphery thereof, is a plurality of lugs 17 which are adapted to be slidably disposed in the grooves 8$^a$ of the tread member. It is of course obvious that the lugs 17 are smaller than the grooves 8$^a$ to allow for play during the self-adjusting operation of the wheel. At the same time the lugs 17 prevent the springs from being distorted. As shown in Figure 2, the lugs do not extend to the end wall of the grooves 8$^a$, so that there is no danger of the lugs interfering with the movement of the tread member. The plates are prevented from disengagement from the hub member 4 by means of the usual wheel securing nuts carried by the axle of the vehicle.

From the foregoing, it will be readily seen that this invention provides a novel form of spring wheel capable of being applied to any vehicle without requiring alterations. In addition to this, the wheel provides means in the form of guard plates for not only protecting the springs, but for assisting in the efficient operation of the wheel by preventing the tread member from moving any great distance independently of the hub member.

What is claimed is:

1. A spring wheel comprising a hub member having rectangular extensions projecting from the side faces thereof, each extension having a plurality of grooves, a tread member, resilient means connecting the tread member to the hub member, plates engaged with the side faces of the hub member, said plates having collars engaging the extensions of the hub member, said collars having inwardly projecting lugs extending into the grooves of the extension and a driving connection between said plates and said tread member.

2. A spring wheel comprising a hub member having reduced rectangular extensions at the sides thereof each formed with a plurality of grooves parallel with the axis of the hub, a tread member resiliently supported from the hub member, side plates engaging against the sides of the hub and tread member, the plates being formed centrally with outwardly extending collars having rectangular openings conformingly engaging upon said extensions, the collars being formed with inwardly extending lugs engaged within said grooves and a driving connection between said side plates and tread member permitting radial shifting of the tread member.

In testimony whereof I hereunto affix my signature.

JULIAN D. TERRELL.